United States Patent [19]

Iskarous et al.

[11] Patent Number: 5,883,679
[45] Date of Patent: Mar. 16, 1999

[54] SCANNING SCHEME FOR IMAGES STORED IN DYNAMIC RANDOM ACCESS MEMORY

[75] Inventors: Moenes Z. Iskarous, Sunnyvale; Vijay Maheshwari, Fremont; Srinivasa R. Malladi, San Jose, all of Calif.

[73] Assignee: C-Cube Microsystems, Inc., Milpitas, Calif.

[21] Appl. No.: 803,287

[22] Filed: Feb. 20, 1997

[51] Int. Cl.$^6$ .................................................. H04N 5/907
[52] U.S. Cl. .......................................... 348/699; 348/716
[58] Field of Search ................................ 348/699, 716; 345/203; 365/230.03, 230.04; 711/208, 209

[56] References Cited

U.S. PATENT DOCUMENTS

| | | | |
|---|---|---|---|
| 5,596,376 | 1/1997 | Howe | 348/716 |
| 5,604,540 | 2/1997 | Howe | 348/405 |
| 5,675,387 | 10/1997 | Hoogenboom | 348/716 |
| 5,719,642 | 2/1998 | Lee | 348/699 |

OTHER PUBLICATIONS

"MPEG–2 FAQ", Chad Fogg, Apr. 2, 1996, http://bmrc, berkeley.edu/projects/mpeg/faq/mpeg2–v38.html.
"Compression Technology", C–Cube Microsystems, Inc. 1996, http://www.c–cube.com/technology/mpeg.html.
Fujitsu, "SDRAM Guide book", Sep. 1995, pp. ii–64.
Didier Le Gall, "MPEG: A Video Compression Standard for Multimedia Applications", *Communications of the ACM*, Apr. 1991, vol. 34, No. 4 pp. 48–58.

*Primary Examiner*—Howard Britton
*Attorney, Agent, or Firm*—Fish & Richardson P.C.

[57] ABSTRACT

A method of retrieving image information is disclosed in which a reference block is selected which overlies three sections of an image stored in a memory having two banks. Exactly two of the sections of the image are stored in the same bank of the memory. A sequence in which to read the three sections is selected such that the two sections in the same bank are not read consecutively. Each section of the image underlying the reference block is read in the selected sequence to retrieve the image information.

23 Claims, 7 Drawing Sheets

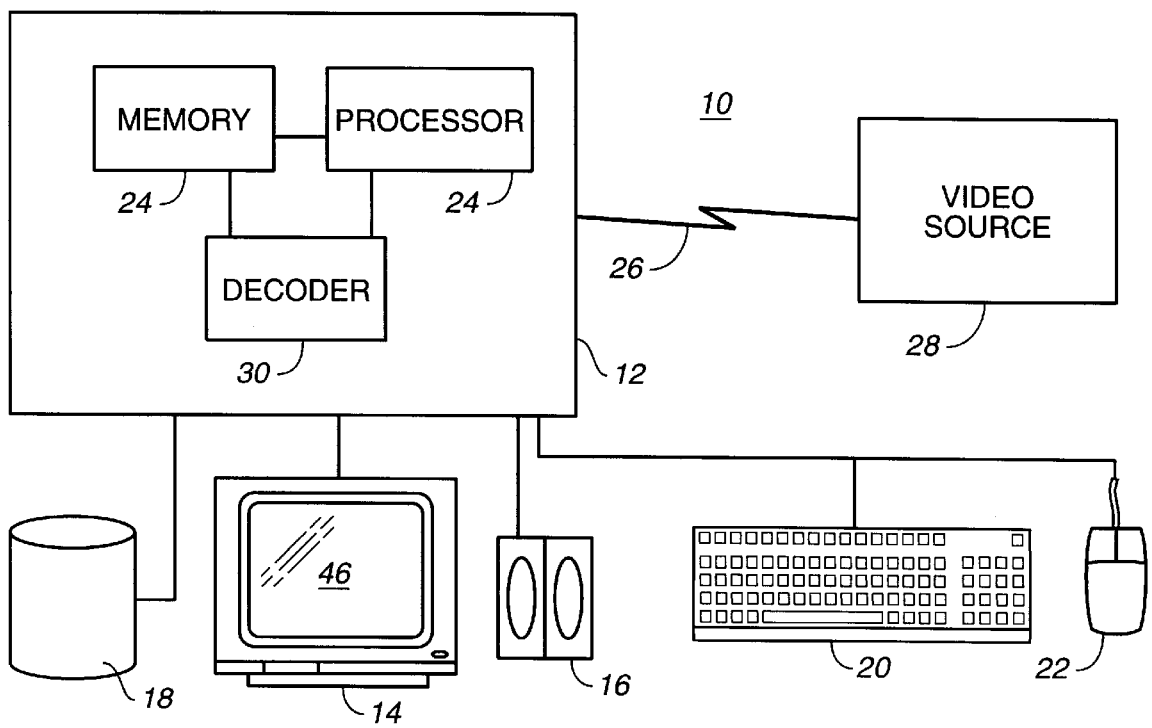
FIG._1
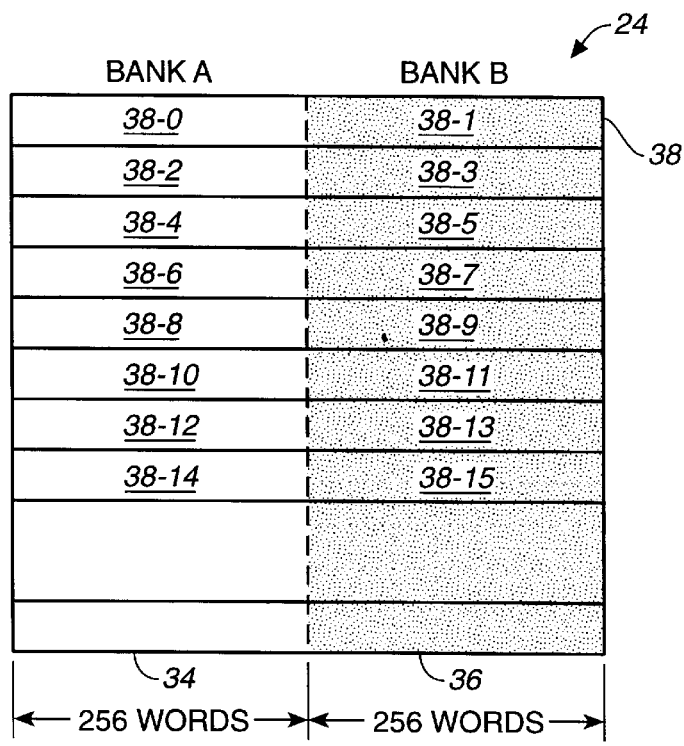
FIG._2

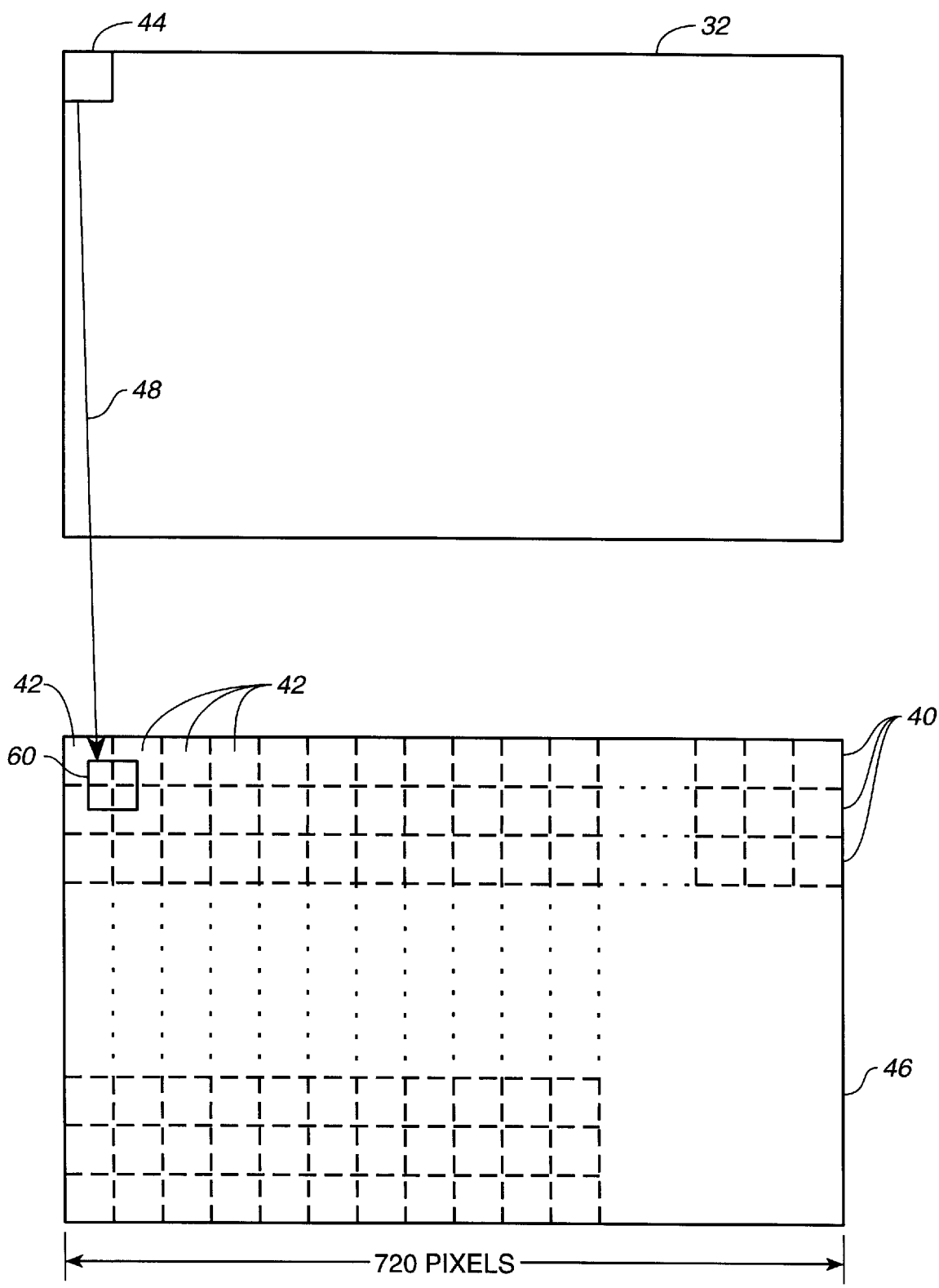
FIG._3

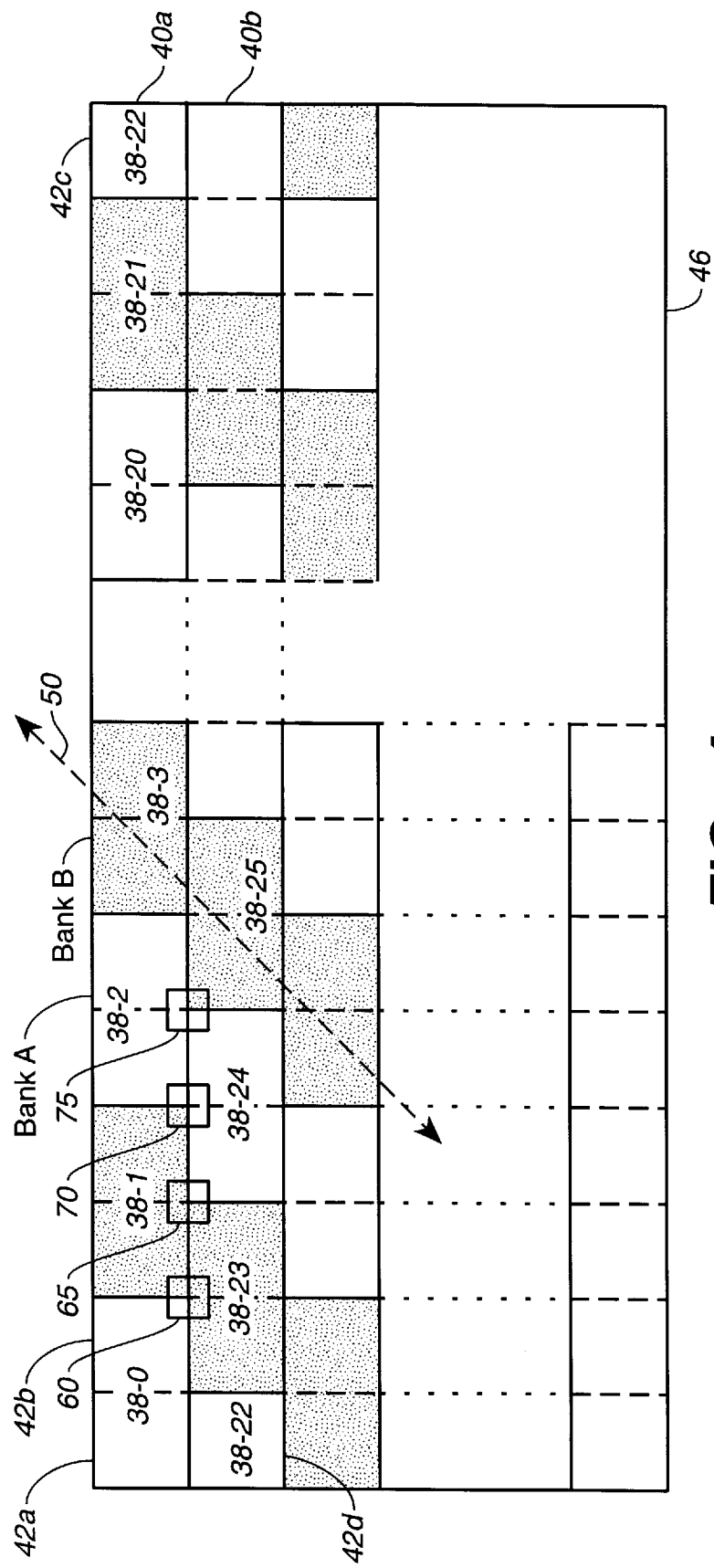
FIG._4

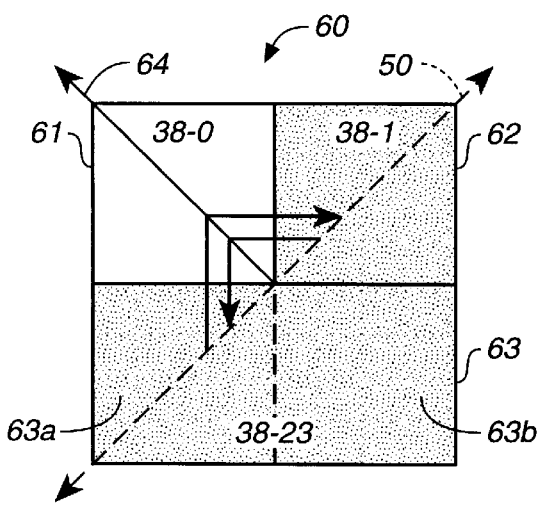
FIG._5A
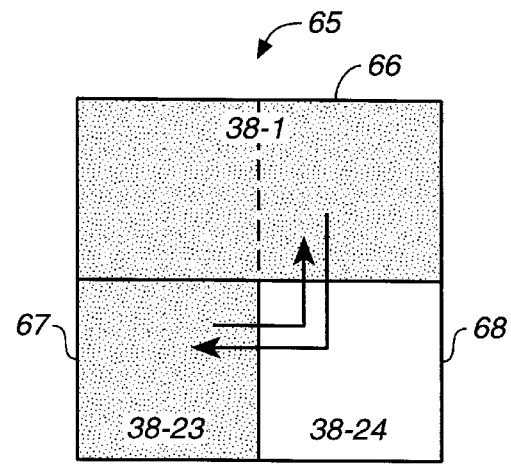
FIG._5B
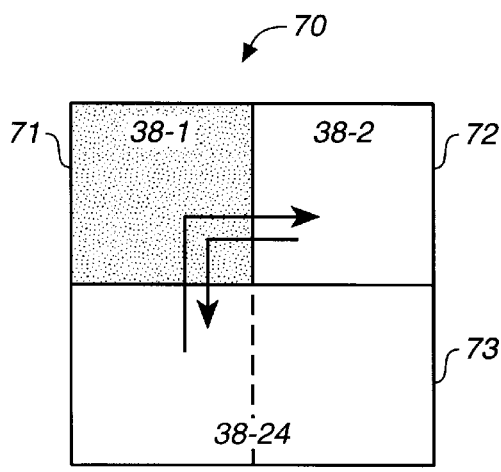
FIG._5C
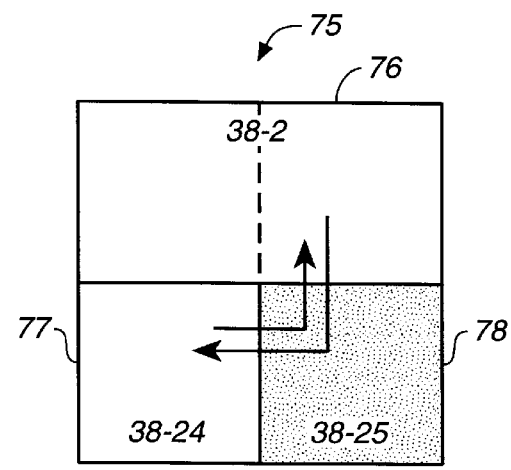
FIG._5D

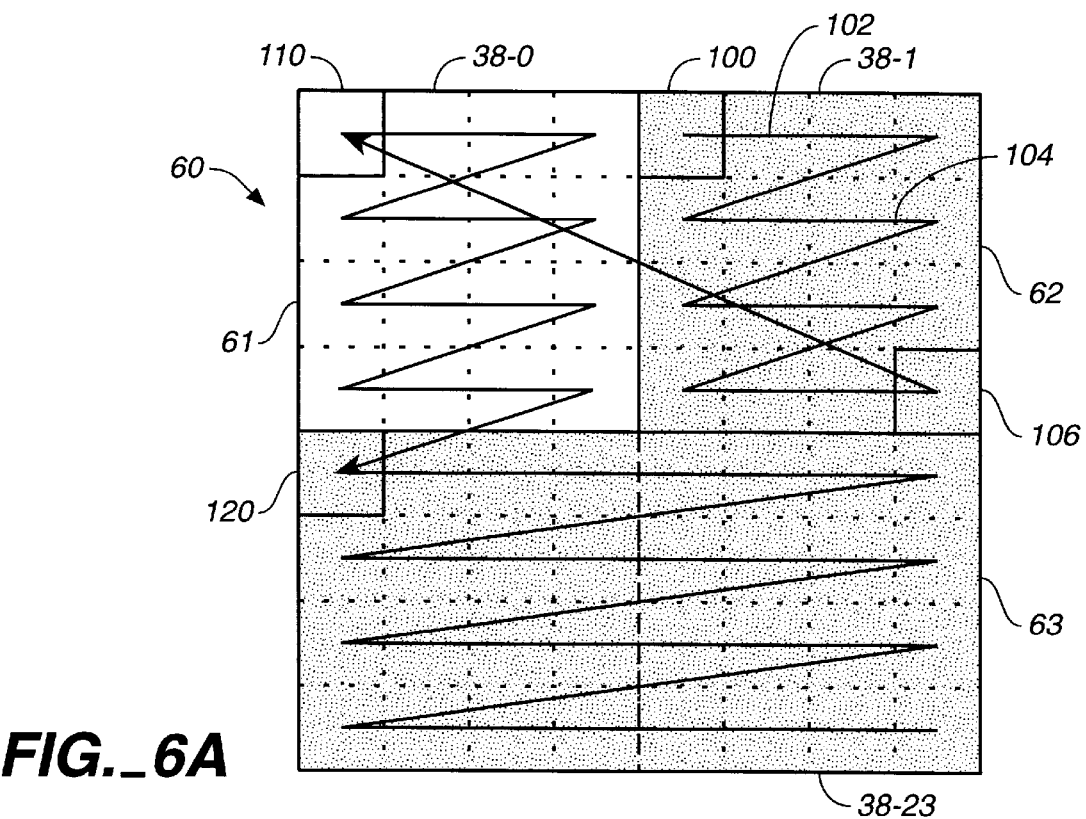
FIG._6A
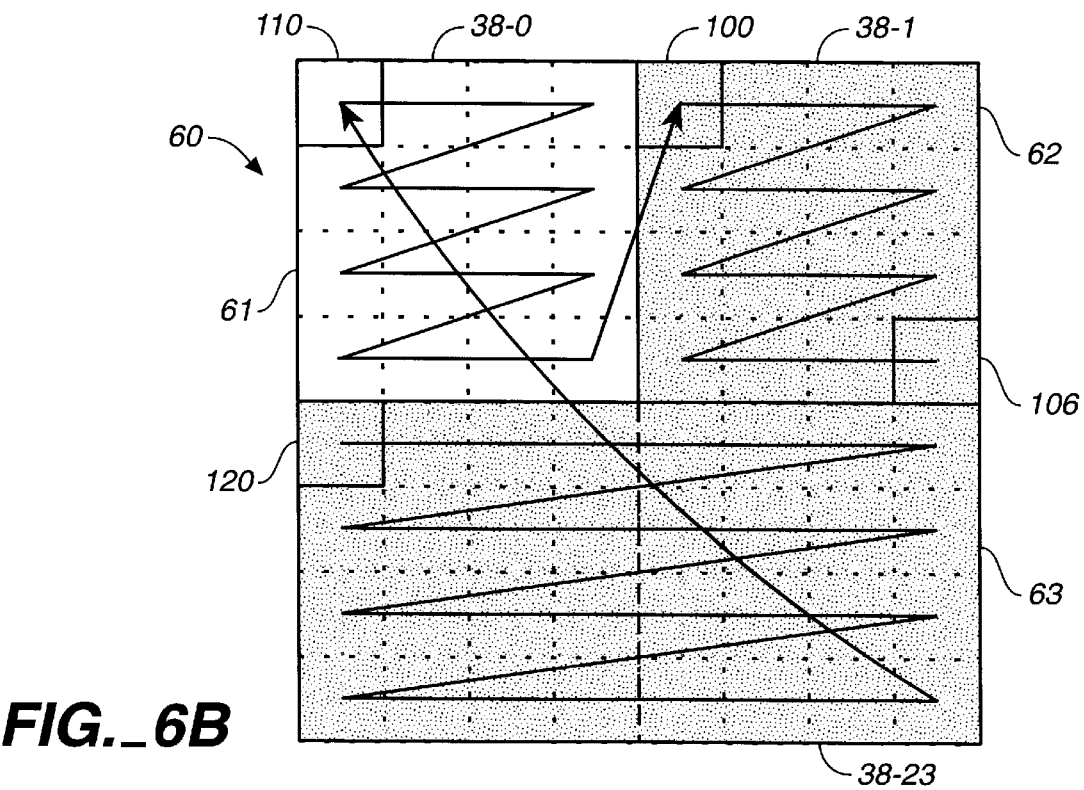
FIG._6B

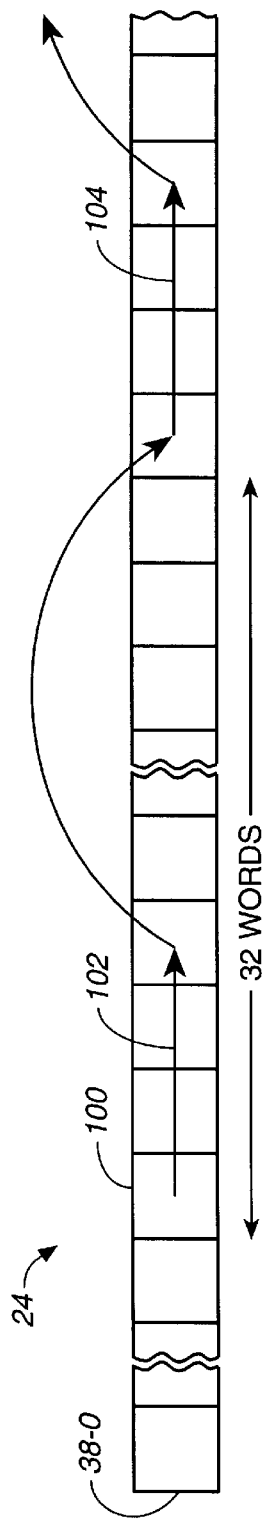
FIG._7
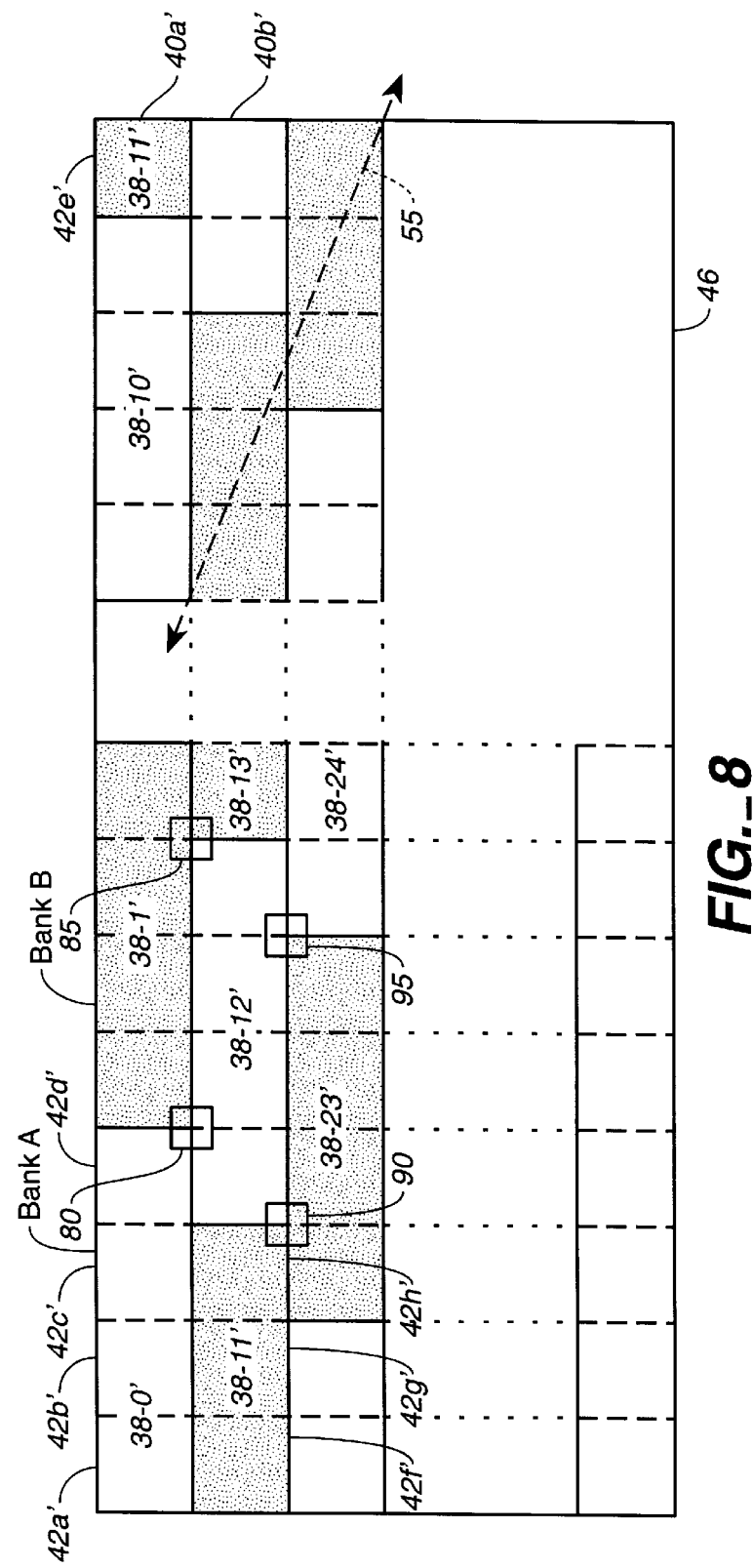
FIG._8

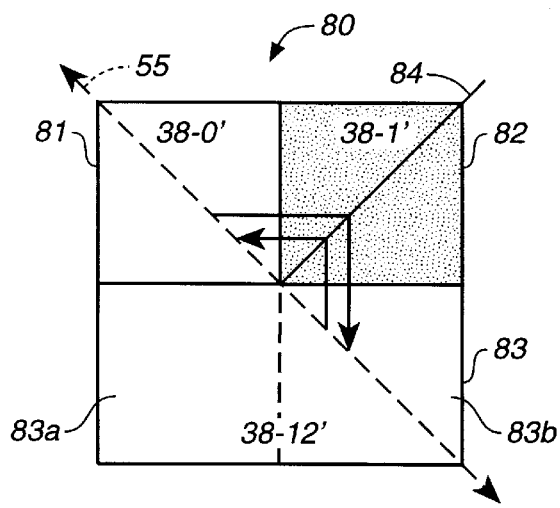
FIG._9A
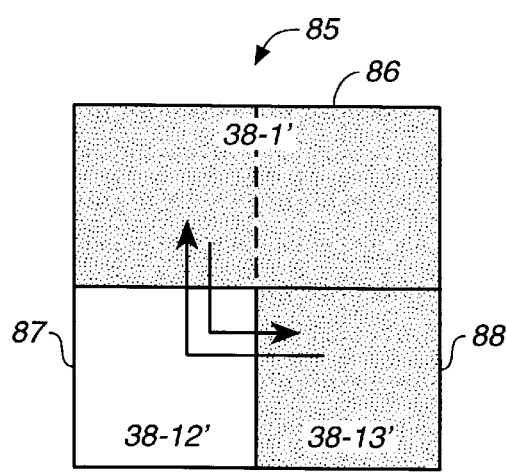
FIG._9B
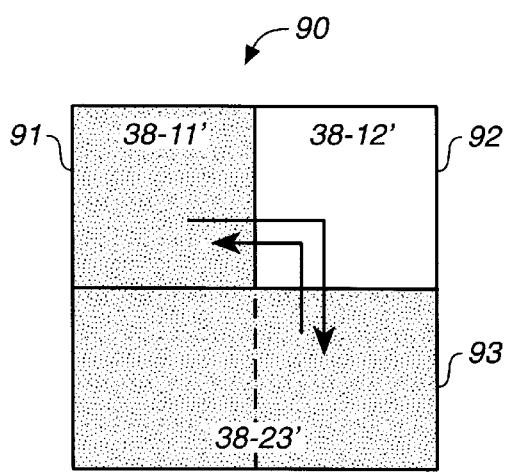
FIG._9C
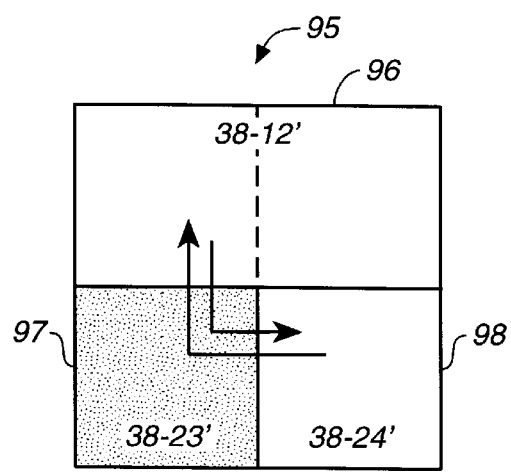
FIG._9D

SCANNING SCHEME FOR IMAGES STORED IN DYNAMIC RANDOM ACCESS MEMORY

FIELD OF THE INVENTION

The present invention relates generally to scanning methods for retrieving information from random access memory, and, more particularly, to scanning methods for retrieving motion compensation information from 16-Mbit and 32-Mbit synchronous dynamic random access memories in a Motion Picture Expert Group (MPEG) video signal decoder.

BACKGROUND

The display of video information via computer is becoming increasingly common. Video data streams, i.e., a sequence of video pictures, include a large amount of digital data. For example, one second of the standard television studio video signal "CCIR 601" may include about twenty Mbytes of data which must be stored. A video signal is typically compressed prior to storage in order to conserve memory. A video signal typically is also encoded prior to transmission to conserve bandwidth. The stored or received video signal is later decompressed and decoded for display on the computer.

Several video compression algorithms have been developed in order to conserve memory and bandwidth. In particular, the video compression standards developed by the Moving Picture Expert Group (MPEG) have become nearly universal. The MPEG standards, known as MPEG-1 and MPEG-2, include a general algorithm to encode digital video and audio signals for consumer distribution. MPEG-1 is designed to be compatible with video signals, such as Source Input Format (SIF), which are stored on compact discs. MPEG-2 is designed to be compatible with broadcast video signals, such as the CCIR 601 standard.

Often, one picture within a video picture sequence is similar to a previous or subsequent picture. This phenomenon is called "temporal redundancy". The MPEG compression standards achieve high compression ratios with compression factors of about eight to thirty by taking advantage of this temporal redundancy, using a technique called "motion compensation". Motion compensation uses image information from previous (or future) pictures to construct the current picture. Some pictures may be significantly compressed by encoding them in terms of their differences from other pictures. A complete description of the MPEG-1 and MPEG-2 standards may be found in the ISO/IEC standard, Coded Representation of Picture, Audio and Multimedia/Hypermedia Information, ISO 11172, the entirety of which is hereby incorporated by reference.

In order to perform motion compensation, a video picture is broken into small sections, called "macroblocks". Each macroblock is compressed separately, producing a compressed signal containing two parts: a motion vector and error terms. The motion vector points to the location of a reference macroblock from another picture containing image information similar to the image information that will be used in the macroblock being encoded. The error terms represent the differences between the reference macroblock and the macroblock being encoded. When the compressed signal is decoded, the decoder reconstructs the original macroblock determining the location of the reference macroblock in a previously decoded reference picture using the motion vector, fetching the appropriate reference macroblock from memory and combining it with the error terms. Thus, to decode each macroblock, the decoder retrieves a portion of the previously decoded video picture stored in computer memory.

A common type of memory is dynamic random access memory (DRAM). When a word is read from a DRAM chip, the memory must have some way of determining whether each bit in the word is on or off. A DRAM chip needs to discharge the charge representing the value of the bit in order to read it. Thus, DRAM chips use a destructive read process. After each memory address is read, that address must be recharged to restore the previously stored bits. The time required to recharge the memory location is known as the precharge delay.

Memory is laid out in rows (also referred to as "pages") and columns. In a traditional memory chip, a memory location is accessed by identifying the proper row, waiting for a period called the "RAS/CAS delay", identifying the proper column, retrieving the data at the memory location identified by the row and the column, and waiting for the precharge delay so that the memory location is recharged. Then the procedure is repeated for the next memory location.

Because the motion vector can point to many locations within in the reference picture, and because a large number of reference macroblocks are fetched during the decompression, an MPEG decoder needs an efficient method of storing and retrieving random portions of an image stored in memory.

SUMMARY

In general, in one aspect, the invention is directed to method of retrieving image information. A reference block is selected which overlies three sections of an image stored in a memory having two banks. Exactly two of the sections of the image are stored in the same bank of the memory. A sequence in which to read the three sections is selected such that the two sections in the same bank are not read consecutively. Each section of the image underlying the reference block is read in the selected sequence to retrieve the image information.

Implementations of the invention include the following. The sections of the reference image underlying the reference block may be read to generate motion compensation information. The reference block may be a reference fetch macroblock. Another reference fetch macroblock which overlies another three sections of the reference image may be selected, and the steps of the method may be iterated until all of the motion compensation information is generated.

In general, in another aspect, the invention is directed to a method of retrieving image information. An image is stored in a memory having two banks. The image includes a plurality of horizontal rows, each row including a plurality of macroblocks. A series of contiguous macroblocks stored in the same bank defines a skew direction. A reference block is selected having three portions overlying sections of the stored image. The reference block includes a first portion overlying a first section from a first macroblock from a first row, a second portion overlying a second section from a second macroblock from the first row, and a third portion overlying a third section from a third and a fourth macroblock in a second row. The image information is read from the three sections in a sequence such that i) the second section is second in the sequence, and ii) a line connecting the second macroblock to its diagonally opposed macroblock in the second row is generally perpendicular to the skew direction.

Implementations of the invention include the following. The memory may use 16-bit words. If the first row is located above the second row, then the first portion may be located to the right of the second portion and if the first row is located below the second row, then the first portion may be located to the left of the second portion. The sequence may be one of the following: first section, second section, third section; or third section, second section, first section.

In general, in another aspect, the invention is directed to an apparatus for retrieving image information. The apparatus includes a memory having two banks for storing an image and a processor. The processor is configured to select a reference block which overlies three sections of the image, with exactly two of the sections of the image being stored in the same bank of the memory, select a sequence in which to read the three sections such that the two sections in the same bank are not read consecutively, and read each section of the image underlying the reference block in the selected sequence to retrieve the image information.

The advantages of the invention include the following. Random portions of a video picture stored in a memory may be efficiently retrieved. A reference macroblock which overlies three or more macroblocks stored in different memory pages may be retrieved without incurring precharge delays.

BRIEF DESCRIPTION OF THE DRAWINGS

FIG. 1 is a schematic and block diagram of a computer system for decoding a video signal in accordance with the present invention.

FIG. 2 is a schematic diagram of memory locations within an interleaved memory used in the computer system of FIG. 1.

FIG. 3 is a schematic diagram of a video picture.

FIG. 4 is a schematic illustration of a scheme for storing a video picture in a 16-Mbit memory.

FIGS. 5A–5D are schematic illustrations of reference macroblocks to be fetched from the video picture stored in memory as shown in FIG. 4.

FIGS. 6A and 6B are schematic illustrations of two scanning sequences used to read the data within the reference macroblock of FIG. 5A.

FIG. 7 is a schematic diagram of a page from the memory of FIG. 2.

FIG. 8 is a schematic illustration of a scheme for storing a video picture in a 32-Mbit memory.

FIGS. 9A–9D are schematic illustrations of reference macroblocks to be fetched from the video picture stored in memory as shown in FIG. 8.

DETAILED DESCRIPTION

Referring to FIG. 1, computer system 10 runs programs enabling a user to view a video stream. The computer system 10 includes a digital computer 12 (such as a personal computer or a work station), a display 14 to display a video picture 46, speakers 16, a mass storage device 18 (such as a floppy disc drive, a hard disc drive, a CD-ROM drive, or a magneto-optical disc drive), a keyboard 20, and a mouse 22 or other pointer device (such as an input tablet). The computer 12 is of conventional construction and includes a memory 24, a microprocessor 25, and other customary components, such as a memory bus and a peripheral bus (not shown). The computer 12 includes a decoder 30 for decoding or decompressing a video signal. The computer 12 also includes communications hardware and programs (not shown) by which the computer system 10 is connected by a communications link 26 to a video source 28.

Programs often access a series of consecutive memory addresses. DRAM chips may be configured to operate in a "page mode" to take advantage of the sequential nature of program execution. In page mode DRAM, the DRAM chip compares the row of the most recently retrieved memory address to the row of the memory address currently being retrieved. If the new address is in a new page (accessing a new page is called a "page crossing"), the DRAM proceeds in the traditional fashion. However, if the new address is in the same page, the DRAM chip immediately identifies the new column and skips the RAS/CAS delay. Therefore, so long as the DRAM chip is accessing memory locations in the same page, the DRAM chip can skip the RAS/CAS delay, thereby significantly increasing the speed of the memory. In addition, the DRAM chip can wait until a page crossing and then recharge the entire row. This permits the DRAM chip to avoid the precharge delay until a page crossing occurs.

In addition, DRAM chips may be configured with an interleaved memory architecture. In an interleaved memory architecture, the memory is broken into two banks. While the computer is accessing memory locations in one bank, the other bank is being recharged. Assuming that the DRAM chip is operating in a page mode, and assuming that the new page is in a different bank, then the previously accessed page (in the first bank) can be recharged while the new page (in the second bank) is being read. This permits the DRAM chip to "hide" the precharge delay at the page crossing. However, if the computer reads from a different page in the same bank, then the memory must wait for the precharge delay.

Referring to FIG. 2, memory 24 is a synchronous dynamic random access memory (SDRAM) which is of sufficient size to store a field or frame of a video image. The memory 24 is configured using an interleaved memory architecture with two banks 34 and 36, referred to respectively as bank A and bank B (bank B is shown as shaded in FIG. 2 for clarity). In addition, the memory 24 is configured to operate in a page mode with a plurality of pages 38. The even pages are stored in bank A and the odd pages are stored in bank B. Preferably, the memory 24 uses words with a length which is a multiple of 16 bits. Typically, a 16-Mbit memory chip uses 16-bit words, whereas a 32-MBit memory chip uses 32-bit words, although this is not required. In addition, the memory 24 may constitute a single chip or multiple chips in parallel, and may include more than two banks. For example, the memory may be a 64-Mbit memory chip configured with 16-bit words and four banks.

Preferably, each page in the memory 24 stores 256 words. Thus, in a 16-Mbit memory chip using 16-bit words, each page stores 512 bytes, whereas in a 32-Mbit memory chip using 32-bit words, each page stores 1,024 bytes.

As previously discussed, an advantage of the interleaved memory architecture of memory 24 is the ability to hide precharge delays. Specifically, as the computer is reading from bank B, the memory locations in bank A are being recharged. The number of memory addresses read consecutively from the same page is called the "burst size", because precharging requires a significant period of time, a minimum burst size is needed to completely hide the precharge delay at a page crossing. In currently available SDRAM chips, precharging requires about nine cycles. Since one address may be read per cycle, about nine addresses must be read consecutively within the same page in order to completely avoid the precharge delay. Thus there is a minimum burst size of nine memory addresses to entirely hide precharge delay. As previously discussed, if the computer must read from different pages in the same bank, then the memory 24 must wait for the precharge delay, and the advantage of the interleaved memory structure is lost. However, if the computer alternates between reading from bank A and bank B, then (assuming that the minimum burst size is met) the precharge delay will be entirely avoided.

Returning to FIG. 1, a decoder 30 is provided to decode or decompress a video signal and to display the resulting video stream on the display 14. The decoder 30 may also extract audio information from the video signal and play the resulting audio signal on the speakers 16. As described in detail below, the decoder 30 uses the memory 24 to store previously decoded and decompressed video pictures. The decoder 30 may be implemented as software, firmware, or hardware, or a combination of software, firmware and hardware.

The video signal may originate from the memory 24, from the mass storage device 18, or from the video source 28. The video source 28 may be a broadcast signal or a consumer electronics device which has been configured to transmit an encoded or compressed video signal, such as a video camera, a laser disc player or a video cassette player. Alternatively, the video source can be a device connected to an external computer system. For example, the decoder 30 may cooperate with a browser program and the computer system 10 may be coupled via the link 26 through the Internet to a computer which runs server software.

In the implementation described below, the video signal is encoded in the MPEG-2 standard. However, the invention may also be applicable to video signals using other standards, such as MPEG-1. Many of the details described are specific to the implementation, and can be changed as is known by those skilled in the art if other standards are used.

Referring to FIG. 3, a video picture 46 to be displayed is divided into rows 40 of macroblocks 42. In the MPEG-2 standard, each macroblock 42 is sixteen pixels wide and sixteen lines high. In a CCIR 601 compliant video signal, the video picture 46 is 720 pixels wide. Thus, in the MPEG-2 standard of a CCIR 601 compliant video signal, there are forty-five macroblocks 42 in each of the rows 40. The number of lines in the video picture is preferably a multiple of 16. In a Phase-Alternation Line (PAL) video signal, the video picture 46 may be either a 576 line frame or a 288 line field, whereas in an National Television Systems Committee (NTSC) video signal, the video picture 46 may be 480 line frame or a 240 line field. Assuming that each pixel in the video picture 46 requires one byte, each macroblock 42 will occupy 256 bytes of memory. Thus, if the memory is a 16-Mbit chip with each page storing 256 16-bit words, two macroblocks 42 can be stored in each page. Similarly, if the memory is a 32-MBit chip with each page storing 256 32-bit words, four macroblocks 42 can be stored in each of the pages.

Referring to FIG. 4, the distribution of the video picture 46 in a memory using 16-bit words is shown schematically. Specifically, the video picture 46 (see also FIG. 1) is divided into macroblocks, and two consecutive macroblocks (e.g., macroblocks 42a and 42b) are stored in each page (e.g., page 38-0) of the memory. In this configuration the data representing a complete line of pixels across the video picture is stored as a portion of each page rather than as a series of sequential addresses. When the video picture is stored in the memory using this storage scheme, the macroblocks stored in bank A and bank B (shown as shaded) become aligned in a skew direction (represented in FIG. 4 by a dotted arrow 50). A group of contiguous macroblocks stored in the same bank define the skew direction 50. In a memory using 16-bit words the skew direction 50 is from the upper right to the lower left. As discussed above, because the video picture 46 is 720 pixels across and each macroblock is sixteen pixels across, each row contains forty-five macroblocks. Because each page of a 16-bit word memory stores two macroblocks, a single row, such as row 40a, requires twenty-two and one-half pages of memory. Consequently, the twenty-third page 38-22 stores a first macroblock 42c in the first row 40a and a second macroblock 42d in a second row 40b. Since each row creates an offset of one-half page, the location of each bank will be offset by one macroblock per row, resulting in the skew direction 50.

As previously discussed, the MPEG standards use motion compensation to encode and decode the video stream. The encoded video stream will include a flag or switch for each macroblock indicating the type of decoding to be used to reconstruct that macroblock. The types of decoding include: intracoding, in which a macroblock is constructed without motion compensation; forward prediction, in which a macroblock uses a previous picture as a reference; backward prediction, in which a macroblock uses the next picture as a reference; and bi-directional prediction, in which macroblock uses both the previous picture and next picture as references.

Returning to FIG. 3, assuming an encoded macroblock 44 in an encoded video picture 32 is to be decoded with prediction, a reference macroblock 60 must be fetched from the reference video picture 46 stored in the memory. In the MPEG-1 standard, the reference macroblock is a sixteen pixel by a sixteen line square, whereas in the MPEG-2 standard, the reference macroblock is a sixteen pixel by eight-line rectangle. For each macroblock 44, the video signal 32 includes a motion vector 48 and error terms (not shown). The motion vector 48 points from the macroblock 44 being decoded to the position of the reference macroblock 60 in reference picture 46. To decode the macroblock 44, the decoder fetches the reference macroblock 60 from the memory. Then the reference macroblock 60 is combined with the error terms to generate the decoded macroblock 44.

Referring to FIGS. 4 and 5A, the reference macroblock 60 includes three portions: an upper left portion 61, an upper right portion 62 and a lower portion 63. The upper left portion 61 overlies a section of a macroblock stored in page 38-0; the upper right portion 62 overlies a section of a macroblock stored in page 38-1; and the lower portion 63 overlies sections of two macroblocks 63a and 63b stored in page 38-23. The upper right portion 62 and the lower portion 63 are stored in the bank B, whereas the upper-left portion 61 is stored in bank A.

When the video decoder fetches the reference macroblock 60 from the 16-Mbit memory, it will scan the portions 61–63 in the following order: either upper right portion 62, upper left portion 61, lower portion 63; or lower portion 63, upper left portion 61, upper right portion 62. That is, the decoder will scan the portions by either decreasing the page within the same row and then increasing the row, or by decreasing the row and then increasing the page within the same row. In both sequences, the upper left portion 61 is the second portion read in the sequence. In addition, a line 64 connecting the upper left portion 61 to its diagonally opposed macroblock 63b in lower portion 63 is generally perpendicular to the skew direction 50.

Referring to FIG. 6A, to scan the reference macroblock 60, the decoder starts with a pixel 100 located in the upper left corner of the upper right portion 62. The decoder then scans rightwardly, reading each pixel in a line 102 within the portion 62. At the end of the line 102, the decoder jumps to the beginning of the next line 104. Thus, the decoder scans the portion 62 from left to right and from top to bottom.

Referring to FIG. 7, each line of pixels in the two adjacent macroblocks stored in a single page is located at a series of contiguous addresses in the memory 24. Since each macroblock is sixteen pixels wide, a single line of pixels crossing two macroblocks is thirty-two pixels long and requires thirty-two consecutive bytes in the memory 24. Similarly, each line across the two adjacent macroblocks is stored consecutively in the memory 24. Thus, when the decoder advances from line 102 to line 104, it merely advances to a new address in the same page of memory. This memory configuration increases the number of memory locations consecutively accessed from the same bank and thereby permits the decoder to effectively use the page mode of SDRAM.

Returning to FIG. 6A, once the decoder reads the last pixel 106 in the lower right corner of the upper right portion 62 of the reference macroblock 60, the decoder jumps to a pixel 110 in the upper left hand corner of the upper left portion 61 of the reference macroblock 60. The decoder then scans each line in the upper right portion 61 from left to right and from top to bottom. Once the upper left portion 61 has been scanned, the decoder jumps to a pixel 120 in the upper left hand corner of the lower portion 63 of the reference macroblock 60.

By scanning all the pixels in portion 62, then all the pixels in portion 61, and then all the pixels in portion 63, the decoder scans first from bank B, then from bank A, and then again from bank B. Thus, each page crossing results in a switch to an alternate bank. Because the scanning sequence alternates between banks, one bank can be recharged while the other bank is being read. Therefore, the scanning sequence permits the decoder to take advantage of the interleaved memory structure of the SDRAM to hide precharges. In addition, the scanning sequence ensures that all of the memory locations in one page are read before proceeding to the next page. This maximizes the number of memory locations read in a single burst, and increases the likelihood of exceeding the minimum burst size.

The scanning sequence may be controlled by software, firmware, or hardware, or a combination of software, firmware and hardware. The processor 25 may be configured to perform the scanning sequence.

Referring to FIG. 6B, in the second sequence, the decoder starts at the pixel 120 in the upper left hand corner of the lower portion 63. When the decoder has completed scanning the lower portion 63, it jumps to the pixel 110 located in the upper left hand corner of the upper left portion 61. Finally, when the decoder has completed scanning the upper left portion 61, it jumps to the pixel 100 in the upper left hand corner of the upper right portion 62. This scanning sequence has the same advantages as the sequence described with reference to FIG. 6A.

Referring to FIGS. 4 and 5B, the decoder may fetch a second reference macroblock 65 from a different position in the reference picture 46. The reference macroblock 65 includes an upper portion 66, a lower left portion 67, and a lower right portion 68. The first portion 66 overlies two macroblocks stored in page 38-1; the lower left portion 67 overlies a section of a macroblock stored in page 38-23; and the lower right portion 68 overlies a section of a macroblock stored in page 38-24. The upper portion 66 and the lower left portion 67 are stored in bank B, whereas the lower right portion 68 is stored in bank A. The decoder will scan the portions 66–68 in the following order: either upper portion 66, lower right portion 68, lower left portion 67; or lower left portion 67, lower right portion 68, upper portion 66. Thus, the decoder will either increase the page within the same row and then decrease a row or increase a row to move to a new page, and then decrease the page within the same row. In both scan sequences, the lower right portion 68 is the second portion read in the sequence.

Referring to FIGS. 4 and 5C, the decoder may fetch a third reference macroblock 70. The reference macroblock 70 includes an upper left portion 71, a upper right portion 72, and a lower portion 73. The upper left portion 71 overlies a section of a macroblock stored on page 38-1; the upper right portion 72 overlies a section of a macroblock stored on page 38-2; and the lower portion 73 overlies sections of two macroblocks stored on page 38-24. The upper right portion 72 and the lower portion 73 are stored in bank A, whereas upper left portion 71 is stored in bank B. To fetch the reference macroblock 70 from the memory, the decoder will scan the portions 71–73 in the following order: either upper right portion 72, upper left portion 71, lower portion 73; or lower portion 73, upper left portion 71, upper right portion 72. Thus, the decoder will either decrease the row and then increase the page within the same row, or decrease the page within the same row and then increase the row. In both scan sequences, the upper left portion 71 is the second portion read in the sequence.

Referring to FIGS. 4 and 5D, the decoder may fetch a fourth reference macroblock 75. The reference macroblock 75 includes an upper portion 76, a lower left portion 77, and a lower right portion 78. The upper portion 76 overlies sections of two macroblocks stored on page 38-2, the lower left portion 77 overlies a section of a macroblock stored on page 38-24, and the lower right portion 78 overlies a section of a macroblock stored on page 38-25. The upper portion 76 and the lower left portion 77 are stored in bank A, whereas the lower right portion 78 is stored in bank B. To fetch the reference macroblock 75 from the memory, the decoder will scan a portion 76–78 in the following order: either upper portion 76, lower right portion 78, lower left portion 77; or lower left portion 77, lower right portion 78, upper portion 76. Thus, the decoder will either increase the row and then decrease the page within the row, or increase the page within the row and then decrease the row. In both scan sequences, the lower right portion 78 is the second portion read in the sequence.

For a 16-Mbit memory using 16-bit words, the scanning sequence may be summarized as follows: if the portion overlying two macroblocks is on the bottom, then the upper left portion will be second in the sequence; if the portion overlying two macroblocks is on the top, then the lower right portion will be second in the sequence.

Referring to FIG. 8, the distribution of the video picture 46 (FIG. 1) in a 32-Mbit memory using 32-bit words is shown schematically. Specifically, the video picture is divided into macroblocks, and four consecutive macroblocks (e.g., 42*a'*–42*d'*) are stored in a single page (e.g., 38-0'). In this configuration, the macroblocks stored in bank A and bank B in a memory using 32-bit words are aligned with a skew direction 55. Specifically, in the memory using 32-bit words, the skew direction 55 is from the upper left to the lower right. Because each page of a memory using 32-bit words stores four macroblocks, the forty-five macroblocks in each row require eleven and one-quarter pages of the memory. Consequently, the twelfth page 38-11' stores one macroblock 42*e'* in a first row 40*a'* and three macroblocks 42*f'*–42*h'* in a second row 40*b'*.

Because a row of macroblocks needs an odd number of pages in a 16-bit word memory, but an even number of pages in a 32-bit word memory, the resulting respective skew directions 50 and 55 are generally perpendicular.

Referring to FIGS. 8 and 9A, the decoder may fetch a reference macroblock 80 from reference picture 46 (FIG. 1) stored in the 32-bit word memory. The reference macroblock 80 includes an upper left portion 81, an upper right portion 82 and a lower portion 83. The upper left portion 81 overlies a section of a macroblock stored on page 38-0'; the upper right portion 82 overlies a section of a macroblock stored in page 38-1'; and the lower portion 83 overlies sections of two macroblocks 83a and 83b stored in page 38-12'. The upper left portion 81 and the lower portion 83 are stored in bank A, whereas the upper right portion 82 is stored in bank B. To fetch reference macroblock 80 from the memory, the decoder will scan the portions 81–83 in the following order: either upper left portion 81, upper right portion 82, lower portion 83; or lower portion 83, upper right portion 82, upper left portion 81. In either order, the upper right portion 82 is second in the sequence. A line 84 connecting the upper right portion 82 to its diagonally opposed macroblock 83b in lower portion 83 is substantially perpendicular to the skew direction 55.

Referring to FIGS. 8 and 9B, the decoder may fetch a second reference macroblock 85 from a different position in the reference picture 46 (FIG. 1). The reference macroblock 85 includes an upper portion 86, a lower left portion 87, and a lower right portion 88. The upper portion 86 overlies two sections of macroblocks stored in page 38-1'; the lower left portion 87 overlies a section of a macroblock stored in page 38-12'; and the lower right portion 88 overlies a section of a macroblock stored in page 38-13'. The upper portion 86 and the lower right portion 88 are stored in bank B, whereas the lower left portion 87 is stored in bank A. To fetch the reference macroblock 85 from the memory, the decoder will scan portions 86–88 in the following order: either upper portion 86, lower left portion 87, lower right portion 88; or lower right portion 88, lower left portion 87, upper portion 86. Thus, the decoder will either increase the row and then increase the page within the row or decrease the page within the row and then decrease the row. In both scan sequences the lower left portion 87 is second in the sequence.

Referring to FIGS. 8 and 9C, a third reference macroblock 90 includes an upper left portion 91, an upper right portion 92, and a lower portion 93. The upper left portion 91 overlies a section of a macroblock stored on page 38-11'; the upper right portion 92 overlies a section of a macroblock stored on page 38-12'; and the lower portion 93 overlies sections of two macroblocks stored on page 38-23'. The upper left portion 91 and the lower portion 93 are stored in bank B, whereas the upper right portion 92 is stored in bank A. To fetch the reference macroblock 90, the decoder will scan the portions 91–93 in the following order: either upper left portion 91, upper right portion 92, lower portion 93; or lower portion 93, upper right portion 92, upper left portion 91. In either order, the upper right portion 92 is second in the sequence.

Referring to FIGS. 8 and 9D, a fourth reference macroblock 95 is fetched from the reference picture 46. The reference macroblock 95 includes an upper portion 96, a lower left portion 97 and a lower right portion 98. The upper portion 96 overlies sections of two macroblocks stored in page 38-12'; the lower left portion 97 overlies a section of a macroblock stored on page 38-23'; and the lower right portion 98 overlies a section of a macroblock stored on page 38-24'. As shown, the upper portion 96 and the lower right portion 98 are stored in bank A, whereas the lower left portion 97 is stored in bank B. To fetch the reference macroblock 95, the decoder will scan the portions 96–98 in the following order: upper portion 96, lower left portion 97, lower right portion 98; or lower right portion 98, lower left portion 97, upper portion 96. In either sequence, the lower left portion is the second portion read in the sequence.

For a 32-Mbit memory, the scan sequence may be summarized as follows: if the portion overlying two macroblocks is on the bottom, then the upper right portion is second in the sequence, whereas if the portion overlying two macroblocks is on the top, then the lower left portion is second in the sequence.

The scanning sequence for both 16-Mbit and 32-Mbit memory may be summarized as follows: one of the two portions located in the same row will be the second portion in the sequence, and a line connecting the second portion in the sequence to its diagonally opposed macroblock in the portion which overlies two macroblocks will be substantially perpendicular to the skew direction.

Since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of retrieving image information, comprising:
a) selecting a reference block which overlies three sections of an image stored in a memory having two banks, two of the sections of the image being stored in the same bank of the memory;
b) selecting a sequence in which to read the three sections such that the two sections in the same bank are not read consecutively; and
c) reading each section of the image underlying the reference block in the selected sequence to retrieve the image information.

2. The method of claim 1, further comprising:
a) selecting another reference fetch macroblock which overlies another three sections of the reference image, exactly two of the other three sections stored in the same bank of the memory; and
e) iterating steps 2(a)–2(c) and 3(a) until all of the motion compensation information is generated.

3. A method of generating motion compensation information, comprising:
a) selecting a first reference fetch macroblock which overlies three sections of a reference image stored in a memory having two banks, exactly two of the three sections of the reference image being stored in the same bank of the memory;
b) selecting a sequence in which to read the three sections such that the two sections stored in the same bank of memory are not read consecutively; and
c) reading each section of the reference image underlying the reference fetch macroblock in the selected sequence to generate the motion compensation information from the reference image.

4. The method of claim 3, wherein
a) the image includes a plurality of horizontal rows, each row including a plurality of macroblocks, and a series of contiguous macroblocks stored in the same bank defines a skew direction,
b) the reference fetch macroblock includes a first portion overlying a first section of a first macroblock in a first row, a second portion overlying a second section of a second macroblock in the first row, and a third portion overlying a third section of a third and a fourth macroblock in a second row, and c) in the selected sequence
  i) the second section is second in the sequence, and
  ii) a line connecting the second macroblock to its diagonally opposed macroblock in the second row is generally perpendicular to the skew direction.

5. The method of claim 4, wherein the memory uses 16-bit words, and wherein
  i) if the first row is located above the second row, then the first portion is located to the right of the second portion and
  ii) if the first row is located below the second row, then the first portion is located to the left of the second portion.

6. The method of claim 5 wherein the sequence is first section, second section, third section.

7. The method of claim 5 wherein the sequence is third section, second section, first section.

8. The method of claim 4 wherein the memory uses 32-bit words, and wherein
  i) if the first row is located above the second row, then the first portion is located to the left of the second portion and
  ii) if the first row is located below the second row, then the first portion is located to the right of the second portion.

9. The method of claim 8 wherein the sequence is first section, second section, third section.

10. The method of claim 8 wherein the sequence is third section, second section, first section.

11. A method of retrieving image information, comprising:
  a) storing an image in a memory having two banks, the image including a plurality of horizontal rows, each row including a plurality of macroblocks, and a series of contiguous macroblocks stored in the same bank defining a skew direction;
  b) selecting a reference block having three portions overlying sections of the stored image, the reference block including a first portion overlying a first section of a first macroblock in a first row, a second portion overlying a second section of a second macroblock in the first row, and a third portion overlying a third section of a third and a fourth macroblock in a second row; and
  c) reading the image information from the three sections in a sequence such that
    i) the second section is second in the sequence, and
    ii) a line connecting the second macroblock to its diagonally opposed macroblock in the second row is generally perpendicular to the skew direction.

12. The method of claim 11 wherein the memory uses 16-bit words, and wherein
  i) if the first row is located above the second row, then the first portion is located to the right of the second portion and
  ii) if the first row is located below the second row, then the first portion is located to the left of the second portion.

13. The method of claim 12 wherein the sequence is first section, second section, third section.

14. The method of claim 12 wherein the sequence is third section, second section, first section.

15. The method of claim 11 wherein the memory uses 32-bit words, and wherein
  i) if the first row is located above the second row, then the first portion is located to the left of the second portion and
  ii) if the first row is located below the second row, then the first portion is located to the right of the second portion.

16. The method of claim 15 wherein the sequence is first section, second section, third section.

17. The method of claim 15 wherein the sequence is third section, second section, first section.

18. The method of claim 11 wherein each row includes forty-five macroblocks.

19. The method of claim 18 wherein the memory includes a plurality of pages.

20. The method of claim 19 wherein each page stores two macroblocks.

21. The method of claim 19 wherein each page stores four macroblocks.

22. An apparatus for retrieving image information, comprising:
  a) a memory having two banks for storing an image; and
  b) a processor configured to
    i) select a reference block which overlies three sections of the image, two of the sections of the image being stored in the same bank of the memory,
    ii) select a sequence in which to read the three sections such that the two sections in the same bank are not read consecutively, and
    iii) read each section of the image underlying the reference block in the selected sequence to retrieve the image information.

23. A computer program for retrieving image information, the computer program tangibly stored on a computer-readable medium, comprising instructions to:
  a) select a reference block which overlies three sections of an image stored in a memory having two banks, two of the sections of the image being stored in the same bank of the memory;
  b) select a sequence in which to read the three sections such that the two sections in the same bank are not read consecutively; and
  c) read each section of the image underlying the reference block in the selected sequence to retrieve the image information.

* * * * *